United States Patent [19]

Pashan et al.

[11] Patent Number: 4,932,020
[45] Date of Patent: Jun. 5, 1990

[54] PACKET SWITCHING ARRANGEMENT INCLUDING PACKET RETRANSMISSION

[75] Inventors: Mark A. Pashan; Avinash K. Vaidya, both of Naperville, Ill.

[73] Assignee: AT&T Bell Laboratories, Murray Hill, N.J.

[21] Appl. No.: 270,725

[22] Filed: Nov. 14, 1988

[51] Int. Cl.$^5$ ............................................. H04L 1/16
[52] U.S. Cl. ......................................... 370/14; 370/60
[58] Field of Search ..................... 370/60, 94, 14, 15, 370/17, 94.1, 94.3, 110.1

[56] References Cited

U.S. PATENT DOCUMENTS 4,670,871 6/1987 Vaidya ................................. 370/60
4,679,190 7/1987 Dias et al. ............................ 370/60

OTHER PUBLICATIONS

B. Beranek and Newman Inc., "The Butterfly Parallel Processor", *VLSI Systems Design*, Mar. 1986, pp. 20, 22.
A. Huang et al., "Starlite: A Wideband Digital Switch", *GLOBECOM '84*, vol. 1, Nov. 26–29, 1984, pp. 121–125.

*Primary Examiner*—Douglas W. Olms
*Assistant Examiner*—Melvin Marcelo
*Attorney, Agent, or Firm*—Kenneth H. Samples

[57] ABSTRACT

A packet switching arrangement in which packet retransmission is provided by the network for packets found by the network to be unusable. A packet switch node is equipped with a packet path and a control signaling path cooperating with packet address route arbitration and gating circuitry for effecting the packet retransmission. As a packet from a network input unit is passed from switch node to switch node a control signaling path through the switch nodes back to the input unit originating the packet is established. When a switch node detects an unusable packet a retransmit control signal is returned via the control signaling path to the input unit originating the packet. The input unit responds to the retransmit signal by resending the original packet. An unusable packet is blocked from further transmission in one embodiment and marked for removal at the network output ports in another embodiment. Unusable packets result from packet corruption or from packet collision within a switch node.

18 Claims, 7 Drawing Sheets

PACKET SWITCHING ARRANGEMENT INCLUDING PACKET RETRANSMISSION

FIELD OF INVENTION

This invention relates to packet switching networks and particularly to switching, signaling and control arrangements for effecting the retransmission of packets when they are detected to be unusable in a packet switching network.

BACKGROUND OF THE INVENTION

Packet switching networks are used to convey digital information among information sources and destinations known as end points. In such systems, an information source end point creates packets, each including a data portion and a routing information portion, and transmits the created packets to an input port of the packet network. The packet network includes a plurality of interconnected nodes which receive the packets in succession and based on the routing information, each node completes a path to another node or a network outport port. Destination end points receive packets from the network output ports.

From time-to-time packets traversing the packet network may become unusable. One situation where a packet becomes unusable occurs when two packets destined for the same output port concurrently enter a node. When a node concurrently receives two packets destined for the same node output port a "packet collision" is known to occur and one of the packets becomes unusable since only one packet can be sent to the same node output port at a time. As a consequence, the node selects one of the packets for transmission to the output port and the nonselected packet is oftentimes dropped. Source and destination end points have heretofore been equipped with the capability of recovering dropped packets but the architecture and node of operation for such recovery usually requires the exchange of additional packets between the end points. Despite the benefits of such arrangements, there is a recognized need in the art for packet networks which recover dropped packets without requiring the exchange of additional packets or the use of end point resources.

The nodes of some packet networks include buffer memory which stores unusable packets in the node where the collision occurred. The node then transmits the stored packet from buffer memory at a later time, when the destination node output port is available. The inclusion of memory for packet holding in each node increases the cost and complexity of the overall network.

One packet network has been devised which solves the packet collision problem without additional memory in the node. In that network, the unusable one of two colliding packets is transmitted to an output of the node not specified by the packet routing information. The unusable packet then continues to traverse the network until a network output port is reached. An arrangement at the output ports of the network detects unusable packets (those sent to incorrect output ports) and recirculates the unusable packets back to input ports of the network which have been specifically provided for the recirculation of unusable packets. The recirculated packets are then merged with and treated in the same manner as normal input packets to the network. This arrangement avoids the use of additional memory in the network nodes, but it increases the number of network input ports required and thus makes the network larger and more complicated than without recirculation.

In view of the foregoing, a need exists in the art for a packet switch network which is capable of retransmitting unusable packets without the additional network complexities caused by buffering packets in the packet switch nodes or recirculation of unusable packets back to the inputs of the packet network.

SUMMARY OF THE INVENTION

The foregoing problems are solved and a technical advance is achieved in accordance with the principles of the invention in which node switching, signaling and control arrangements are provided for effecting a retransmission of packets without either the need for buffer memory in the nodes or packet recirculation equipment. To elaborate, as a switching node connects a packet over a packet path to a downstream node, it advantageously completes a control signaling path between an input unit which originated the packet and the downstream switching node. When a downstream switching node determines that a packet is unusable, a control signal indicating unusability is returned to the source input unit via the previously completed control signaling path. The input unit responds to that control signal by retransmitting the original packet.

In arrangements such as sorting networks it is desirable not to block packets traversing the network even when they are unusable. The nodes of an embodiment of the present system include the ability to mark packets as unusable and transmit them toward the network outputs. When a packet is marked unusable a block control signal is returned to the input unit via the block signal path. Packets marked as unusable are detected and removed by a trap circuit at the network outputs. Marking unusable packets in conjunction with the removal of marked packets by the trap circuit allows all packets to continue through the network satisfying the requirements of sorting networks and permitting the removal of unusable packets at the network outputs and the retransmission of packets from the network inputs.

An illustrative switching node comprises an arbitration unit which interprets routing information included in packets and controls a packet gate to complete packet paths to downstream nodes. The node also includes a block signal gate which is controlled by the arbitration unit to complete the control signaling paths from downstream nodes to packet originating input units.

An illustrative embodiment includes an input for transmitting to a first switching node a packet including routing information to which the first node responds by connecting the packet to a second switch node and, advantageously, by a departure in the art, completing a block signal path from the second switch node to the input unit. The second switch node comprises an arbitration unit for determining when a packet is unusable and for sending a block signal to the input unit via the block signal path completed by the first node when a packet is determined to be unusable. The input unit responds to the block signal by retransmitting the packet to the first node. Retransmission is accomplished from a buffer storage in the input unit which according to this invention is operated in response to the block signal so that a new representation of a packet previously determined to be unusable can be read therefrom and again be transmitted to the first switching node.

In a specific embodiment of the invention, unusable packets occur when two packets enter a two input node and collide when they are destined for the same output port. The collision is detected by comparing the routing information of the packets. When a collision is detected, a determination is made that one of the packets is unusable and a block control signal is returned via the block signal path to the input unit which sent the unusable packet. The arbitration unit in each of the nodes includes a select flip-flop, the state of which is used in the determination of the unusable packet. The state of the select flip-flop is changed after each packet collision detection to alternate the preference between any two colliding packets.

Packets can be unusable for reasons other than packet collision. For example, a packet which has become corrupted by the change of digit values is determined to be unusable in accordance with the disclosed system. A node in accordance with an aspect of the present invention includes an arrangement for determining that a packet is unusable when it is found to be corrupted. The node responds to such an unusable packet by transmitting a block control signal back to the input unit over the block signal path provided by prior switch nodes.

DETAILED DESCRIPTION

Figure 1:
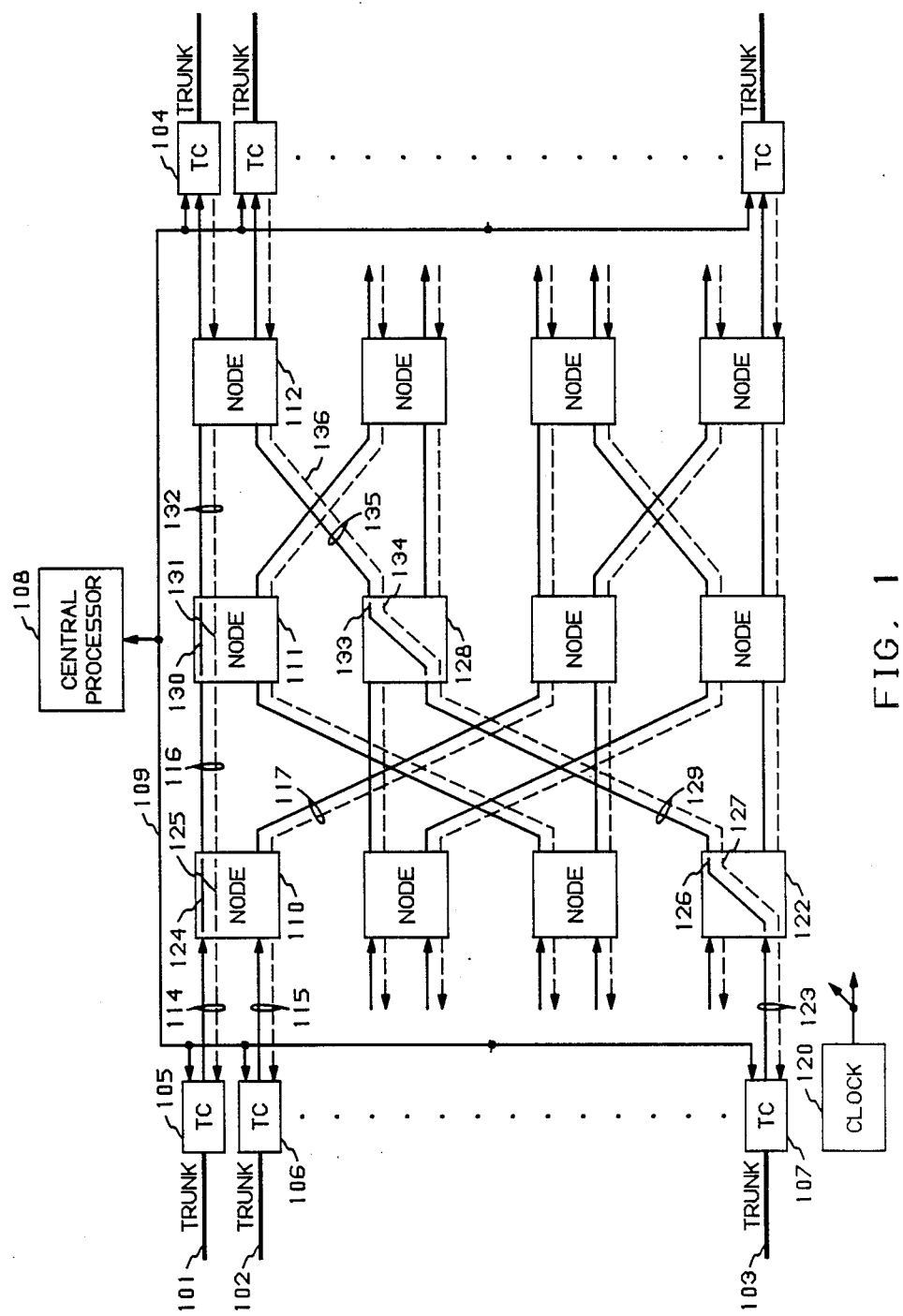
FIG. 1 is a block diagram of an embodiment of the invention.

FIG. 1 is a block diagram of a packet switching network embodying the present invention. Packets are generated by a source end point (not shown) and received over trunks e.g. 101, 102 and 103 by individual trunk controllers e.g. 105, 106 and 107. The trunk controllers 105 through 107 buffer the received packets and convert their destination addresses into network addresses which define a specific output port of the packet network. A central processor 108 communicates with the trunk controllers over a conductor 109 to establish appropriate network addresses. The network fabric is comprised of 12 packet nodes e.g. 110, 111 and 112 arranged in three stages of four nodes each. The packet nodes such as packet node 110 are each connected to two input communication paths e.g. 114 and 115 and two output communication paths e.g. 116 and 117. The nodes of individual stages are interconnected in a well-known pattern of a banyan network.

Figure 2:
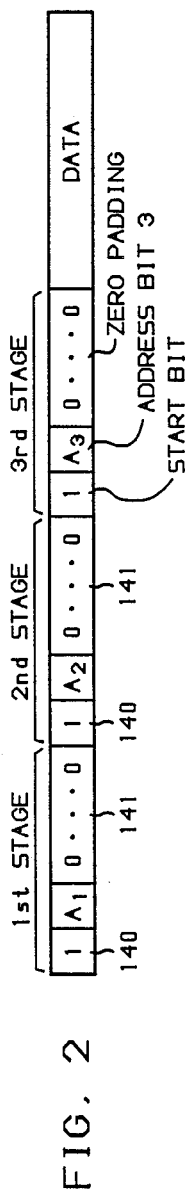
FIGS. 2, 6 and 9 are representative of packets conveyed in the embodiment.

FIG. 2 shows a representative packet which includes three address bits A1, A2 and A3. Illustratively, each address bit controls a node in one of the three stages. Address bit A1 controls a node e.g. 110 in the first stage, address bit A2 controls a node e.g. 111 in the second stage and address bit A3 controls a node e.g. 112 in the third stage. Each node responds to a logic 1 address bit by gating the packet containing the bit to the upper output e.g. 116 and to a logic 0 address bit by gating the packet to the lower output e.g. 117.

Illustratively, equal length packets are transmitted to the network in synchronism and the nodes convey the packets in bit synchronism. A clock circuit 120 provides the necessary timing signals to all nodes and trunk controllers to maintain synchronization. Packets are simultaneously transmitted to the network by the trunk controllers at the beginning of a recurring packet interval. The packet interval is of sufficient duration so that a packet can traverse the entire network before the beginning of the next packet interval. Immediately subsequent packets are transmitted starting at the beginning of the immediately subsequent packet interval.

It is possible that a node e.g. 112 may simultaneously receive two input packets having address bits defining the same node output. When this occurs, called packet collision, only one of the packets can be sent to the defined output and the other packet is unusable. Importantly, the embodiment includes arrangements for retransmitting the unusable packets without requiring that protocol packets be exchanged by the end point devices (not shown). The replacement of unusable packets by retransmission is implemented by the nodes and the trunk controllers.

Each node responds to a predetermined address bit of a packet to complete a communication path from a trunk controller e.g. 105 or upstream node e.g. 110 to a downstream node e.g. 111 or output trunk controller e.g. 104. A communication path e.g. 114 between nodes or between a node and a trunk controller comprises two conductors. One conductor, represented as a solid line in FIG. 1, conveys packets from upstream units to downstream units for packet transmission. The second conductor, represented by a dashed line in FIG. 1, provides a path for downstream units to signal upstream units that an unusable packet has been found and blocked. The signal on the second conductor is called a block signal. As each packet traverses the network it leaves behind the block signal path (dotted conductor) back to the trunk controller which originated the packet. If a packet is found to be unusable and is blocked, the node discovering such transmits a block signal (a logic 1) on the block signal path of the node input which received the unusable packet. The block signal follows the block signal path through the preceding nodes to the trunk controller which originated the now unusable packet. The trunk controller receiving the block signal then retransmits a copy of the unusable packet during a succeeding packet transmission interval.

The following example illustrates the operation of the FIG. 1 packet network in response to packet collisions. At the beginning of the packet interval trunk controller 105 transmits to node 110 via communication path 114 a packet having address bits A1=1, A2=1 and A3=1 and trunk controller 107 transmits to node 122 via communication path 123 a packet having the same address bits. Node 110 responds to the packet from trunk controller 105 by completing a packet path 124 to node 111 and a block signal path 125 from node 111 to trunk controller 105. Node 122, in response to the packet from trunk controller 107, completes a packet path 126 and a block signal path 127 to node 128 via communication path 129. In the second stage of the network, node 111 responds to the packet address by completing a packet path 130 to node 112 and a block signal path 131 from node 112 to communication path 116. Also in the second stage node 128 responds to the packet address by completing a packet path 133 to node 112 and a block signal path 134 from node 112 to communication path 129. In the third stage, node 112 simultaneously receives from nodes 111 and 128 two packets having a third stage address bit A3=1. This is a packet collision. Node 112 determines, for reasons discussed later herein, that the packet on communication path 135 is unusable and that the packet on communication path 132 is to be transmitted to the designated node output. In response to the determination that the packet on communication path 135 is unusable, a block signal is applied by node 112 to the block signal path 136 of communication path 135. The block signal is returned to trunk controller 107 via the path comprising block signal path 134, communication path 129, block signal path 127 and communication path 123. During the next packet interval trunk controller 107 responds to the block signal by transmitting a representation of the previously transmitted packet which was blocked by note 112.

Figure 3:
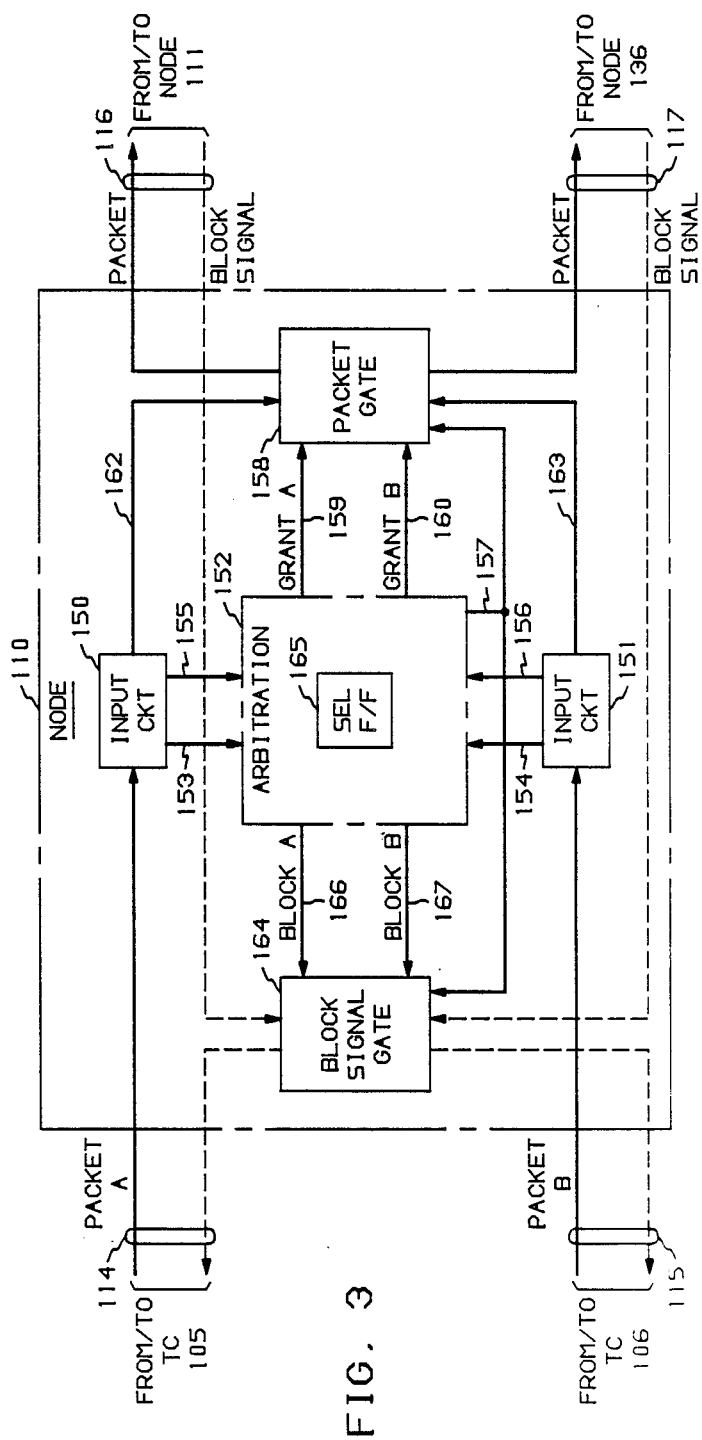
FIG. 3 is a block diagram of a switching node.

FIG. 3 is the block diagram of the internal structure of node 110. The description of node 110 is representative of all nodes of the system which are substantially identical. Node 110 includes two input circuits 150 and 151 each of which is connected to a trunk controller e.g. 105 via a communication path e.g. 114. For ease of understanding a packet received on the upper communication path 114 is referred to as packet A and a packet received on the lower communication path is referred to as packet B.

Before continuing the description of FIG. 3, the reader's attention is directed to the representative packet of FIG. 2. Each address bit e.g. A1 is preceded by a logic 1 start bit 140 and succeeded by a field of zero padding 141. Additionally, the trunk controllers transmit a constant logic 0 on the network input between packet transmission to effectively place logic 0 padding before the first stage start bit 140. The logic 1 start bit after a field of zeros notifies a node that a packet is being received. Input circuits 150 and 151 (FIG. 3) respond to the logic 1 start bit 140 on respective communication paths 114 and 115 by gating the start bit to an arbitration arrangement 152 via a respective conductor 153 and 154. The next bit received by an input circuit e.g. 150 after a start bit, is an address bit for the receiving node. The address bits A1 received by input circuits 150 and 151 are gated to arbitration arrangement 152 via respective conductors 155 and 156. Arbitration arrangement 152 determines which output communication path e.g. 116 and 117 is to receive which incoming packet and controls the completion of block signal paths from downstream nodes to upstream nodes.

Figure 4:
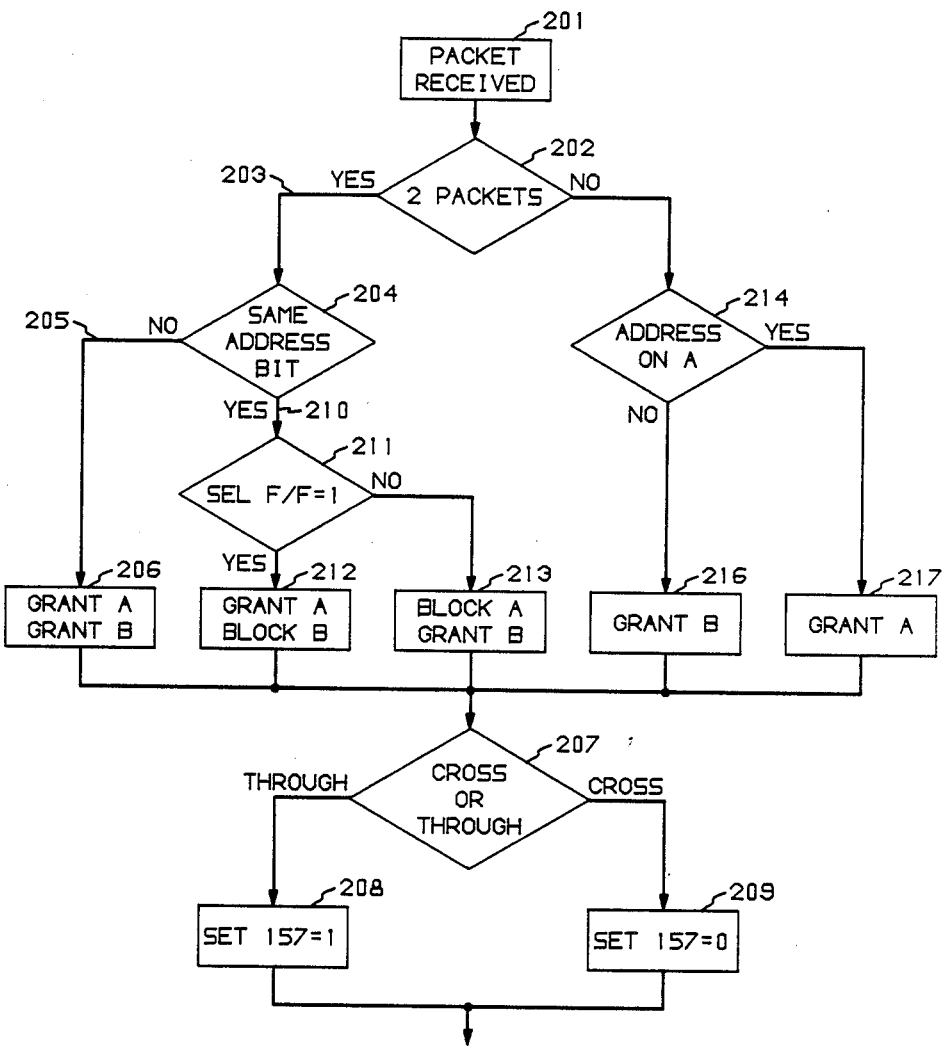
FIG. 4 is a flow diagram of the operation of its node of FIG. 3.

FIG. 4 is a flow diagram of the operation of arbitration unit 152. When one input circuit e.g. 150 receives a start bit (block 201) the arbitration arrangement 152 checks (decision block 202) to determine if both input circuits 150 and 151 have received a packet. Both input circuits are receiving packets when both conductors 153 and 154 are conveying a logic 1 start bit. When two packets have been received, the flow precedes along the path 203 to action block 204 to determine if both packets include the same first address bit A1. When the address bits are not the same, the packets are destined for different node outputs and the flow precedes via path 205 to block 206. In action block 206 a logic 1 grant A signal and a logic 1 grant B signal are generated. The grant A and grant B signals are applied to a packet gate 158 via conductors 159 and 160, respectively. Packet gate 158 receives packets from input circuit 150 via a conductor 162 and packets from input circuit 151 via a conductor 163. Packet gate 158 responds to a logic 1 grant A signal by enabling the use of the packet received at input circuit 150 (packet A) for a node output and to a logic 1 grant B signal by enabling the use of the packet received at input circuit 151 (packet B) for a node output. The particular node output for each packet is selected by the arbitration arrangement 152 in the manner discussed below.

After the generation of grant A and grant B signals in block 206 the arbitration arrangement 152 precedes to block 207 where the appropriate connection pattern of input packets to node outputs is selected. Only two connection patterns exist between node inputs and outputs. In the first pattern, called the through pattern, the packet A received by the node 110 on communication path 114 is transmitted from the node on communication path 116 and the packet B received by the node on communication path 115 is transmitted from the node on communication path 117. In the second pattern, called the cross pattern, the packet A is transmitted from the node on communication path 117 and the packet B is transmitted from the node on communication path 116. The arbitration arrangement 152 reads the address bits from the conductors 155 and 156 and generates a logic 1 through signal (action block 208) on conductor 157 when the through pattern is correct and generates (action block 209) a logic 0 on conductor 157, when the cross pattern is correct. Packet gate 158 responds to the signal on conductor 157 by completing the connection defined thereby between the input 114 and 115 communication paths and the output communication paths 116 and 117.

The nodes e.g. 110 of the present embodiment complete paths for packets and they complete paths for block signals to be returned to the input trunk controllers e.g. 105. The representative node of FIG. 3 includes a block signal gate 164 which is used to complete block signal paths. Block signal gate 164 responds to the connection pattern signals on conductor 157 to complete these paths. When the through pattern is signaled by a logic 1 on conductor 157, block signal gate 164 connects the block signal path of communication path 116 to the block signal path of communication path 114 and the block signal path of communication path 117 to the block signal path of communication path 115. Alternatively, when the signal on conductor on 157 is a logic 0, the block signal path of communication path 116 is connected to the block signal path of communication path 115 and the block signal path of communication path 117 is connected to the block signal path of communication path 114.

In the preceding description of the arbitration arrangement 152 flow diagram shown in FIG. 4, the incoming packets included different address bits A1. When two packets have the same address bits they are both destined for the same output port and only one will be transmitted on. The other packet is unusable. In the flow diagram of FIG. 4 the comparison step 204 detects the identity of address bits and the flow precedes along path 210 to action block 211 where one packet is selected for further transmission and the other packet is determined to be unusable. Illustratively, arbitration arrangement 152 includes a select flip-flop 165 which defines the one of two colliding packets to transmit to a later node. Select flip-flop 165 is in the logic 1 state. In action block 211 the state of select flip-flop 165 is checked and when it is a logic 1 the packet received on communication path 114 is transmitted to the defined node output while the packet received on communication path 115 is unusable. The flow precedes to action block 212 in which a logic 1 grant A signal is generated on conductor 159 and a logic 1 block B signal is generated on conductor 167. Packet gate 158 responds to the grant A signal by enabling the use of the packet received on communication path 114 for transmission to a downstream node. The logic 1 block B signal on conductor 167 is connected by a block signal gate 164 to the block signal path of communication path 115. The logic 1 block B signal is returned via a path including the connections between upstream nodes and the paths through the block signal gates of those upstream nodes to the trunk controller which originated the now blocked unusable packet. The use of the block signal by the trunk controllers is discussed later herein. After the select flip-flop 165 has been used to select a packet, it is toggled so that its state is different the next time it is used. The next time the select flip-flop 165 is checked in action block 211 it will be in the logic 0 state and the action block 213 will be executed instead of the action block 212. In action block 213 a block A signal is transmitted to the block signal path of the communication path 114 via conductor 166 and block signal gate 164.

In the preceding examples two packets were present at the input of the node in FIG. 3. When only one packet is present, the flow diagram proceeds from action block 202 to action block 214 where the active input (either packet A or B) is determined. When the packet is received on communication path 114 a grant A signal is generated (block 217) on conductor 159 and the flow diagram continues to action block 207. Alternatively, when the single packet is on communication path 115 the flow continues to action block 216 where a grant B signal is generated.

Figure 5:
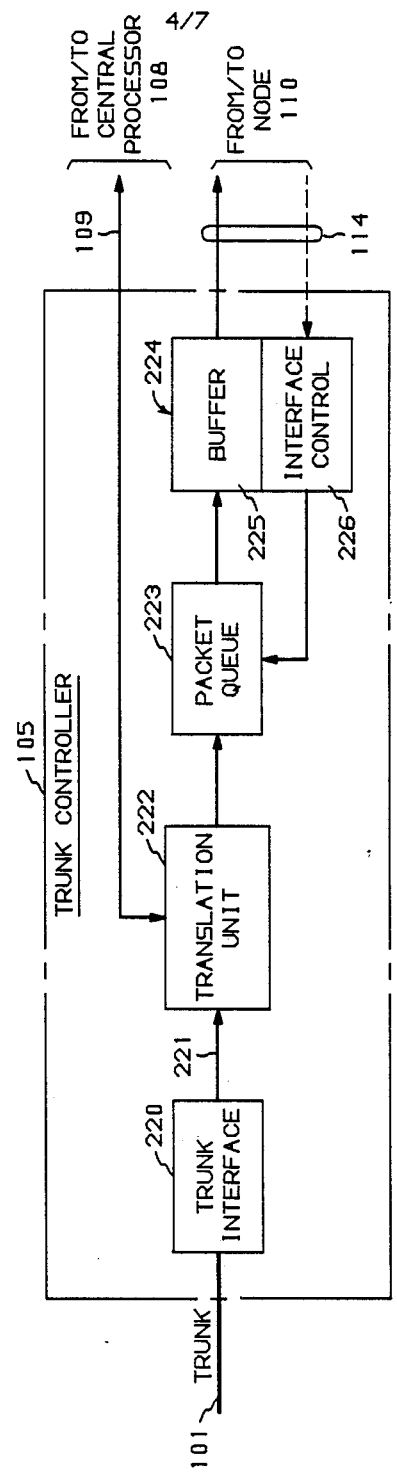
FIG. 5 is a block diagram of a trunk controller.

FIG. 5 is a block diagram representation of an input trunk controller e.g. 105. All of the input trunk controllers 105 through 107 are substantially identical. The trunk controller in FIG. 5 receives packets from an incoming trunk 101 at an interface 220. Interface 220 collects the digits of incoming packets from the trunk and forwards the received packets via conductor 221 to a translation unit 222. Translation unit 222 includes a translation table (not shown) which is consulted to convert the destination header of packets received from incoming trunks into a 3 address bit destination header of the type shown in FIG. 2 for transmission through the nodes of the network. Whenever translation unit 222 does not include translation mapping information for a new connection, translation unit 222 communicates with central processor 108 to obtain translation mapping information for the new connection. The translation unit appends the network level destination header to the received packet and the packet is stored in a packet queue 223. A network interface 224 which comprises a buffer 225 and an interface control 226 reads packets from packet queue 223 and transmits them to the packet network via communication path 114.

The interface control 226 of each input trunk controller e.g. 105 is connected to the block signal path of a network input communication path e.g. 114. When no block signal is received by interface control 226 during a packet interval, interface control 226 reads a new packet from packet queue 223 and stores it in buffer 225 for transmission during the next packet interval. Alternatively, when a block signal is received by interface control 226 during a packet interval, interface 226 does not read a new packet from packet queue 223 but leaves the prior packet in the buffer 225 for retransmission. In the absence of block signals from the network new packets are read from packet queue 223 and stored in buffer 225 for transmission to the network. However, when a block signal is received, interface control 226 leaves the prior packet in buffer 225 for retransmission during the next packet interval.

Figure 7:
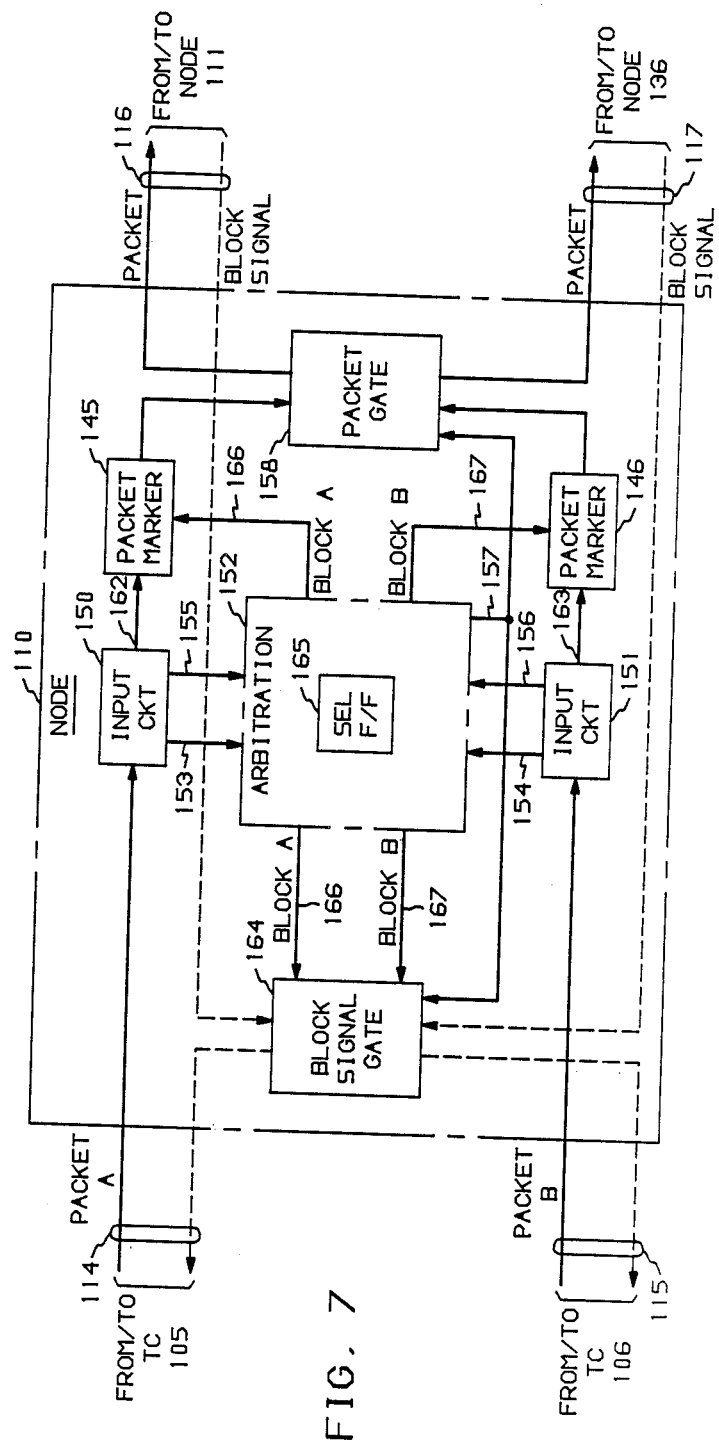
FIGS. 7 and 10 are block diagrams of switching nodes equipped for embodiments of the invention.

The nodes of certain switching networks, such as sorting networks, require that both node inputs receive a packet in order to properly switch the packets. Dropping unusable packets in such a network is not permitted. FIG. 7 shows an embodiment of a node which does not drop unusable packets but marks them and transmits them to downstream nodes. Packet marker circuits 145 and 146 are included in this node to make unusable packets in response to the previously discussed block A and block B signals, respectively.

Figure 6:
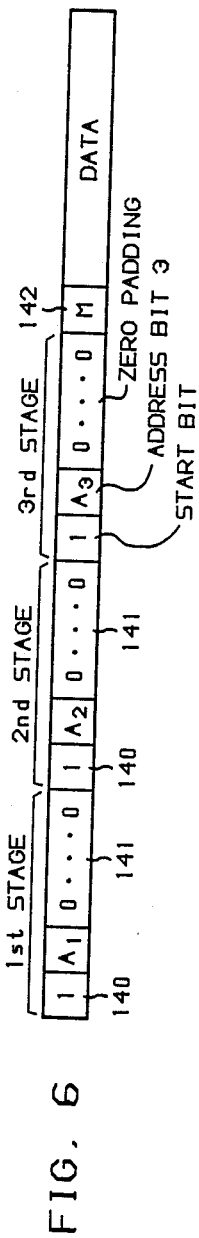
Figure 8:
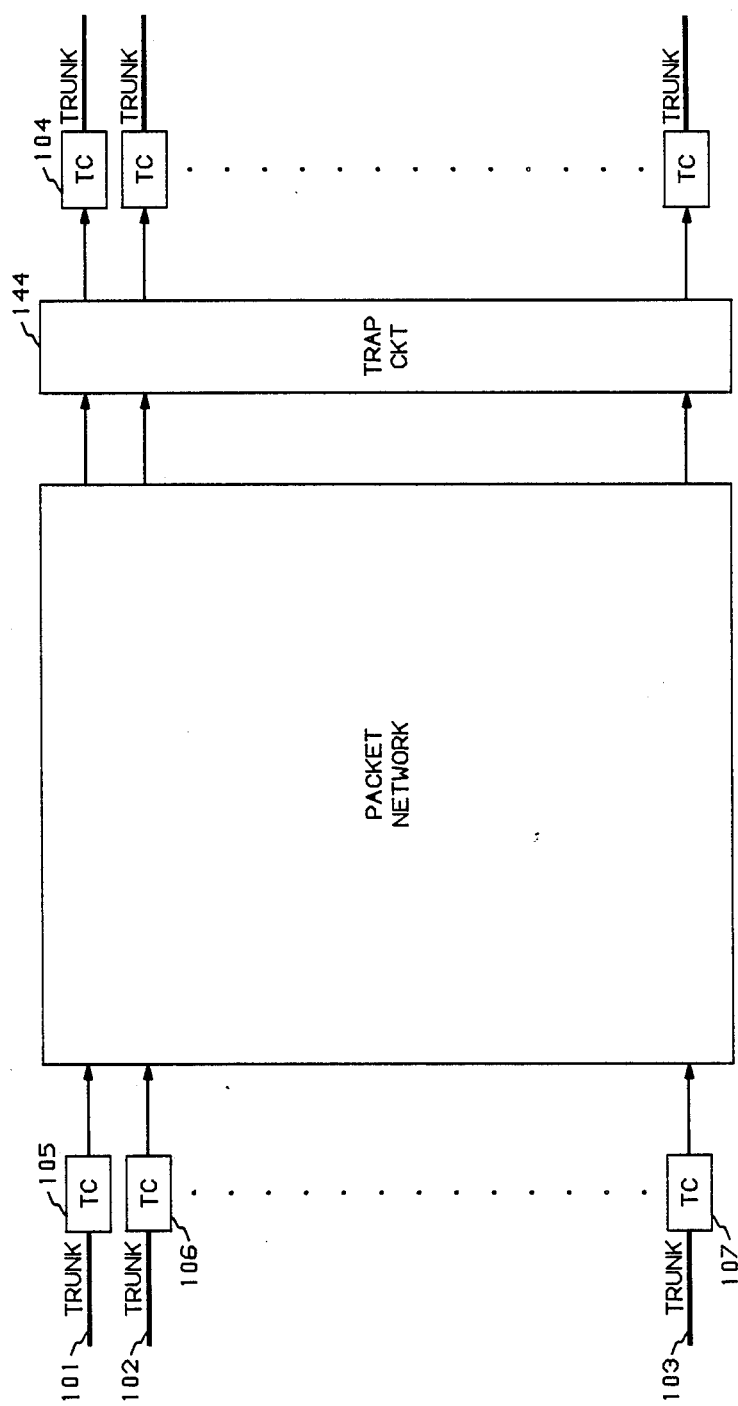
FIG. 8 is a block diagram of a packet network including a trap circuit.

FIG. 6 is a representation of a packet for use with a node shown in FIG. 7. This packet includes a bit position 142 which is used for packet marking. All packets entering the network contain a logic 0 bit position 142. When a node determines that a packet is unusable and generates a block A or block B signal the packet marker circuit e.g. 145, which passes the unusable packet, changes bit 142 to a logic 1. A trap circuit 144 (FIG. 8) at the network output ports checks each packet as it exits the network and drops each packet having a logic 1 bit 142.

Figure 9:
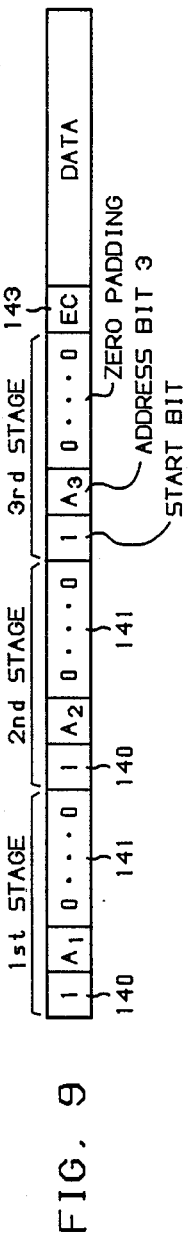
Figure 10:
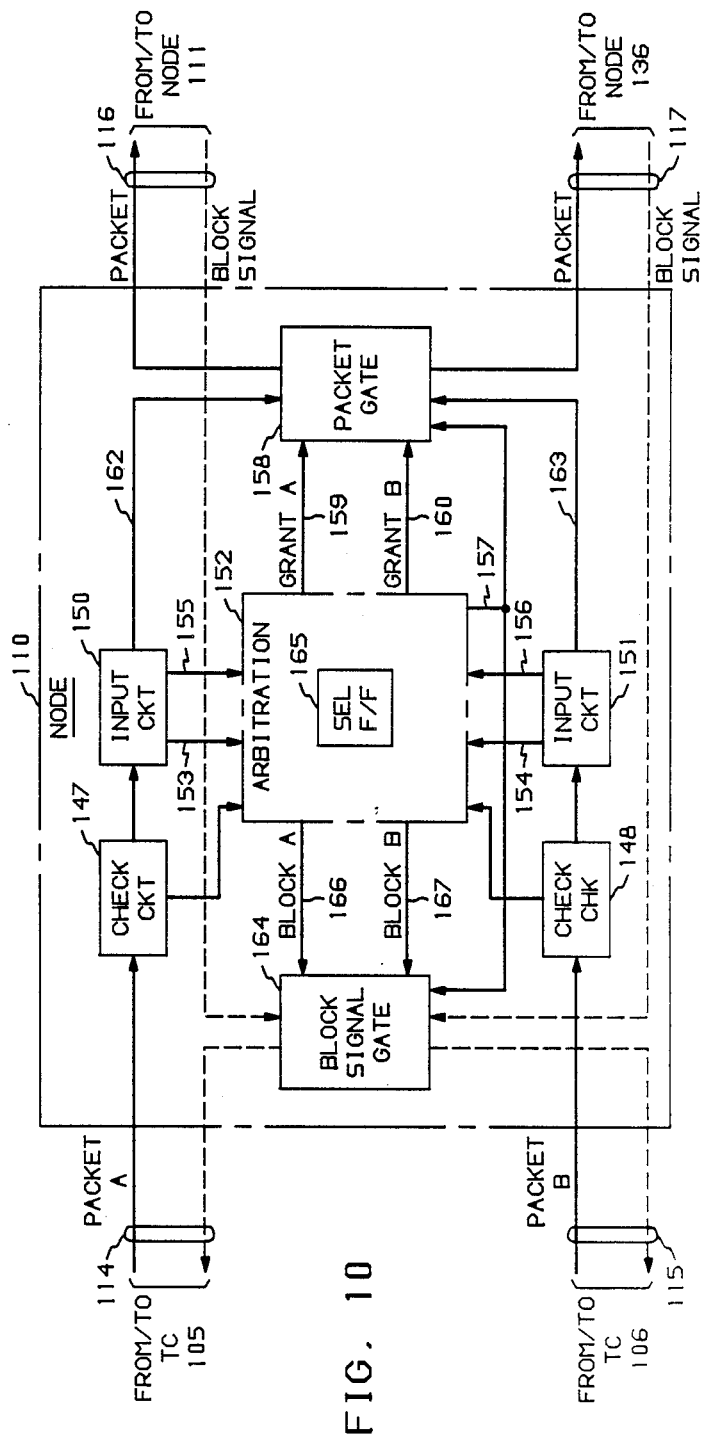

The preceding description relates to unusable packets which resulted from packet collision. Packets can also become unusable due to erroneous changes of the values of their digits. Arrangements are well known in the art for detecting so called corrupt packets by comparing packet information with an error check code in the packet. A packet including an error check code 143 over the packet routing information is shown in FIG. 9. FIG. 10 represents a switch node e.g. 110 which applies the principals of the present invention to packets which are unusable due to errors therein.

The node of FIG. 10 is substantially the same as the node of FIG. 3 except for the addition of error check circuits 147 and 148 and their connection to respective input communication paths 114 and 115 and to the arbitration arrangement 152. Arbitration arrangement 152 generates a block A signal on conductor 166 and inhibits the grant A signal on conductor 159 when check circuit 147 detects a packet error. Similarly, arbitration arrangement 152 generates a block B signal on conductor 167 and inhibits a grant B signal on conductor 160 when check circuit 148 detects a packet error.

We claim:

1. A packet switching arrangement comprising:
input means for transmitting a packet including routing information;
a first switching node connected to said input means for receiving said packet and in response to said routing information for connecting said packet to a second switching node via a packet path and for completing a control path from said second switching node to said input means; and
said second switching node comprises means for determining when said packet is unusable, means responsive to a determining of an unusable packet for transmitting a control signal to said input means via said control path from said second switching node to said input means, means responsive to said determining means for marking said packet unusable and means for transmitting said packet including said unusable marking to an output port of said second switching node.

2. The arrangement of claim 1 wherein said input means comprises means responsive to said control signal for retransmitting said packet to said first switching node.

3. The arrangement of claim 2 wherein said input means comprises means for storing said packet and said means for retransmitting comprises means for transmitting said packet from said storage means to said first switching node.

4. The arrangement of claim 1 wherein said second switching node comprises means responsive to said error checking means for inhibiting the transmission of said packet from said second node when said packet is determined to be erroneous.

5. The arrangement of claim 1 further comprising trap means connected to said output port for receiving packets transmitted to said output port and for inhibiting the further transmission of packets including said unusable marking.

6. The arrangement of claim 1 wherein said second switching node comprises a packet error checking means for identifying erroneous packets and said means for determining is responsive to said packet error checking means for determining that an erroneous packet is unusable.

7. A packet switching arrangement comprising:
first input means for transmitting a first packet including routing information;
second input means for transmitting a second packet including routing information;
a first switching node for receiving said first packet and in response to the routing information included therein for connecting said first packet to a second switching node and for completing a signal path from said second node to said first input means;
a third switching node for receiving said second packet and in response to the routing information included therein for connecting said second packet to said second switching node; and
said second switching node comprises means for determining that said first packet is unusable, means responsive to said means for determining for transmitting an unusable packet signal to said first input means via the signal path from said second node to said first input means, means responsive to said determining means for marking said first packet unusable and means for transmitting said first packet including said unusable marking to an output port of said second switching node.

8. The arrangement of claim 7 wherein said first input means comprises means responsive to said unusable packet signal for retransmitting said first packet to said first switching node.

9. The arrangement of claim 8 wherein said first input means comprises means for storing said first packet and said means for retransmitting comprises means for transmitting said first packet from said storage means to said first switching node.

10. The arrangement of claim 7 wherein said second node comprises an output port; and
said means for determining comprises means for determining that said first packet is unusable when both said first and said second packets are destined for said output port.

11. The arrangement of claim 7 wherein said second node comprises an output port and a select flip-flop; and
said means for determining comprises means responsive to the state of said select flip-flop when both said first and said second packets are destined for said output port, for determining that said first packet is unusable.

12. The arrangement of claim 11 comprising means for changing the state of said select flip-flop.

13. The arrangement of claim 7 wherein said second switching node comprises a first and a second output port
said means for determining comprises means for determining that said first packet is unusable when both said first and said second packets are destined for said first output port; and said second switching node comprises
means responsive to said means for determining for transmitting said second packet to said first output port and for transmitting said first packet including said unusable marking to said second output port.

14. A packet switching arrangement comprising:
input means for transmitting a packet including routing information;
a first switching node connected to said input means for receiving said packet and in response to said routing information for connecting said packet to a second switching node via a packet path and for completing a control path from said second switching node to said input means; and
said second switching node comprises error checking means for determining when said packet is erroneous, and means responsive to a determining of an erroneous packet for transmitting a control signal to said input means via said control path from said second switching node to said input means.

15. The arrangement of claim 14 wherein said input means comprises means responsive to said control signal for retransmitting said packet to said first switching node.

16. The arrangement of claim 15 wherein said input means comprises means for storing said packet and said means for transmitting comprises means for transmitting said packet from said storage means to said first switching node.

17. The arrangement of claim 14 wherein said second switching node comprises means responsive to said error checking means for marking said packet unusable and means for transmitting said packet including said unusable marking to an output port of said second switching node.

18. The arrangement of claim 17 further comprising trap means connected to said output port for receiving packets transmitted to said output port and for inhibiting the further transmission of packets including said unusable marking.

* * * * *